(12) United States Patent
Jung et al.

(10) Patent No.: US 8,280,586 B2
(45) Date of Patent: Oct. 2, 2012

(54) DETERMINATION OF THE ACTUAL YAW ANGLE AND THE ACTUAL SLIP ANGLE OF A LAND VEHICLE

(75) Inventors: Andreas Jung, Regensburg (DE);
Andreas Mayer, Regensburg (DE);
Peter Trippler, Neu Anspach (DE)

(73) Assignee: Continental Automotive GmbH, Hannover (DE)

( * ) Notice: Subject to any disclaimer, the term of this patent is extended or adjusted under 35 U.S.C. 154(b) by 1029 days.

(21) Appl. No.: 11/915,101

(22) PCT Filed: Apr. 11, 2006

(86) PCT No.: PCT/EP2006/061523
§ 371 (c)(1),
(2), (4) Date: Nov. 20, 2007

(87) PCT Pub. No.: WO2006/128758
PCT Pub. Date: Dec. 7, 2006

(65) Prior Publication Data
US 2008/0201038 A1    Aug. 21, 2008

(30) Foreign Application Priority Data

May 31, 2005   (DE) .......................... 10 2005 024 875

(51) Int. Cl.
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *B60T 7/12* | (2006.01) |

(52) U.S. Cl. ............................................. 701/41; 701/75
(58) Field of Classification Search .................. 701/41, 701/75
See application file for complete search history.

(56) References Cited

U.S. PATENT DOCUMENTS 5,983,161 A    11/1999   Lemelson et al. ............ 701/301
(Continued)

FOREIGN PATENT DOCUMENTS
DE           3830747 A1    3/1990
(Continued)

*Primary Examiner* — Thomas Tarcza
*Assistant Examiner* — Imran Mustafa
(74) *Attorney, Agent, or Firm* — King & Spalding L.L.P.

(57) ABSTRACT

In a method for determining the actual yaw rate and slip angle of a vehicle, a slip angle characteristic is first determined by a driving condition sensor system, a yaw rate sensor and a position determination system. If the slip angle characteristic remains below a threshold value, the actual yaw angle is adjusted to match the actual speed vector angle. Otherwise, the actual yaw angle is determined by a continuous value integration using yaw rate sensor values and the slip angle is calculated as the difference between the yaw angle and the speed vector angle. The slip angle is reliably determined with sufficient accuracy, without the need for additional sensors, if the values of the slip angle increase over several seconds. In addition, the yaw angle is reliably determined over long periods of time and the deviations in the values that occur in the integrating methods are adjusted at frequent intervals.

9 Claims, 3 Drawing Sheets

U.S. PATENT DOCUMENTS

| | | | |
|---|---|---|---|
| 6,275,773 B1 | 8/2001 | Lemelson et al. | 701/301 |
| 6,298,294 B1 * | 10/2001 | Murata et al. | 701/37 |
| 7,058,486 B2 | 6/2006 | Arndt | 701/1 |
| 2001/0025210 A1 * | 9/2001 | Tozu et al. | 701/1 |
| 2001/0056317 A1 * | 12/2001 | Nishizaki et al. | 701/48 |
| 2002/0198655 A1 | 12/2002 | Bevly et al. | 701/213 |
| 2003/0040849 A1 | 2/2003 | Hathout et al. | 701/1 |
| 2004/0024565 A1 * | 2/2004 | Yu et al. | 702/151 |
| 2004/0030479 A1 * | 2/2004 | Arndt et al. | 701/70 |
| 2004/0128036 A1 * | 7/2004 | Arndt | 701/1 |

FOREIGN PATENT DOCUMENTS

| | | |
|---|---|---|
| DE | 4200061 A1 | 7/1993 |
| DE | 10247991 A1 | 4/2004 |
| DE | 10327695 A1 | 1/2005 |
| DE | 10328685 A1 | 1/2005 |
| EP | 0433322 B1 | 11/1994 |
| GB | 2263180 A1 | 7/1993 |

* cited by examiner

DETERMINATION OF THE ACTUAL YAW ANGLE AND THE ACTUAL SLIP ANGLE OF A LAND VEHICLE

CROSS-REFERENCE TO RELATED APPLICATIONS

This application is a U.S. national stage application of International Application No. PCT/EP2006/061523 filed Apr. 11, 2006, which designates the United States of America, and claims priority to German application number 10 2005 024 875.6 filed May 31, 2005, the contents of which are hereby incorporated by reference in their entirety.

TECHNICAL FIELD

The invention relates to a method and to a device for determining the actual yaw angle and the actual slip angle of a land vehicle.

BACKGROUND

The yaw angle $\Psi$ is defined as the angle between the longitudinal axis of the vehicle and an axis parallel to the surface of the earth in an earth-fixed coordinate system.

The slip angle $\beta$ is the angle between the speed vector of a point secured to the vehicle (i.e. the vehicle's centre of gravity) and the longitudinal axis of the vehicle. Longitudinal and lateral inclination are acquired by the pitch angle $\theta$ and roll angle $\phi$ of the vehicle. Roll, pitch and yaw angles are defined to DIN 70000.

The actual horizontal orientation of the vehicle, which is acquired by way of the yaw angle, can be used for rapid route determination in vehicle navigation but it is primarily important in this connection as an auxiliary quantity in slip angle determination. The slip angle provides information about the vehicle orientation with respect to the direction of movement and constitutes a measure of the lateral slippage of the vehicle so to speak. If side slippage of the vehicle occurs, the vehicle usually leaves its stable driving condition and enters a dangerous situation which potentially overtaxes the driver.

Optimally exact knowledge of the yaw and slip angles therefore means that such dangerous situations can be quickly recognized, and this in turn allows fast, electronically controlled intervention in the driving situation with the aid of electrically controllable actuators, for example of the drive train, braking system, steering, suspension/damping, etc., and therewith automatic stabilization of the vehicle. This represents a fundamental contribution to driving safety in borderline and dangerous situations.

The yaw angle of a vehicle is conventionally determined in the presence of a yaw rate sensor by integration of the yaw rate signal. Such yaw rate sensors (gyroscopes) may nowadays be produced with properties suitable for a vehicle at comparatively low cost and are already available in vehicles with electronic stability programs, ESP, or navigation systems.

Problems with this determination of the yaw angle frequently result for example as a result of temperature-dependent value differences (offsets) in the yaw rate signals which cause an error in the integration of the yaw angle that increases at least linearly over time. Time-dependent drifts of the offsets as well as falsification of the results by carriageway gradients also lead to an additional increase in the integration error. The difference in the calculated yaw angle from the actual yaw angle therefore increases continuously. This can lead to misinterpretations of the actual driving situation and in the worst case even to incorrect interventions in vehicle control.

Alternatively the yaw angle may be obtained by evaluating the wheel speed sensors that always exist in vehicles with antilock braking systems, ABS, and, if present, a steering angle sensor or steering wheel sensor. The main problem of this method is the wheel slippage, in particular side slippage, wheel properties such as the dynamic wheel radius in particular must be known and an increasing error occurs here as well owing to integration offsets.

A satellite-assisted positioning system (for example GPS) may also be used to determine the yaw angle, as is disclosed in documents U.S. Pat. No. 5,983,161 and U.S. Pat. No. 6,275,7773. However, for this either at least two aerials are required at different points of the vehicle that are as far apart as possible respectively. In the case of two or more GPS aerials in one vehicle orientation of the vehicle on the carriageway may be determined from the relative positions of the aerials in the earth-fixed system. In this case the absolute accuracy of the position determination imposes limits and such a solution is also not very practicable for cost reasons.

A further possibility lies in the fact that the angle of the speed vector of the vehicle, supplied by the GPS receiver, with respect to an earth-fixed axis is approximately equated to the yaw angle. However, this is no longer possible with increasing slip angles, i.e. precisely in a dangerous situation.

The slip angle is conventionally determined by the forces acting on the individual wheels, in particular the lateral forces. With the driving condition sensor systems that are conventionally present in current medium-size vehicles the lateral forces may be determined only inexactly and this method can only be applied in the case of small slip angles (<1-2°). With large slip angles the lateral acceleration, yaw rate and speed of the vehicle are conventionally used to determine the slip angle. Integration over the generally small difference of two large numbers is necessary in this case. Offsets of lateral acceleration and yaw rate sensors and falsification of the lateral acceleration values by transverse gradients of the carriageway can lead to significant errors in this connection. The existing sensor noise leads, moreover, to increasing integration errors when determining the slip angle.

Application US 2002/0198655 A1 proposes use of a satellite-assisted position determining system for determining the slip angle. The slip angle is determined as the difference between the direction of the speed vector of the vehicle and the orientation of the longitudinal axis of the vehicle, i.e. the yaw angle. However this method is only practicable if the yaw angle of the vehicle can be determined with adequate precision. Where only one GPS aerial exists but no additional surroundings sensor system, integrating methods would have to be used which, as already discussed, lead to offsets.

Finally, publication DE 10327695 A1 proposes determining the slip angle by way of a lane recognition system. The sensor system required for this is expensive and therefore exists in only a small number of vehicles.

There is the drawback in the described solutions that the required accuracy is not permanently ensured when determining the yaw and slip angles. Using additional and necessary sensor systems makes the available systems expensive and therefore unsuitable for use in a wide range of vehicles, including in the lower price categories.

SUMMARY

According to various embodiments, a method and a device equally allow accurate determination of the yaw angle in the case of small slip angles and sufficiently accurate determination of large slip angles. Determination of yaw and slip angles can be carried out with an inexpensive system based on sensors that exist in the vehicle anyway. Ultimately this should increase the vehicle safety and be affordable for a broad range of users.

According to an embodiment, a method for determining the actual yaw angle and the actual slip angle of a land vehicle with the aid of a driving condition sensor system, a yaw rate sensor and a position determining system, comprises the steps of: —determining at least one slip angle characteristic of the land vehicle with the aid of sensor values which are provided by the driving condition sensor system internal to the vehicle and/or the yaw rate sensor; —determining an actual speed vector angle which is determined as the angle between a speed vector of the land vehicle, determined with values of the position determining system, and an earth-fixed axis; —comparing the at least one slip angle characteristic with at least one fixed characteristic limit value; wherein—if the characteristic limit value is fallen below: —adjusting the actual yaw angle to match the actual speed vector angle, and—determining the actual slip angle with the aid of the sensor values which are provided by the driving condition sensor system internal to the vehicle and/or the yaw rate sensor; —if the characteristic limit value is exceeded: —determining the actual yaw angle with the aid of sensor values which are provided by the yaw rate sensor by continuous value integration on the basis of a preceding adjustment to the speed vector angle, and—determining the slip angle as the difference between the thus determined yaw angle of the land vehicle and the actual speed vector angle.

According to a further embodiment, the method steps can be repeated in fixed or changeable time intervals. According to a further embodiment, a static characteristic limit value and a dynamic characteristic limit value, which characterizes the increase in the slip angle, can be established. According to a further embodiment, at least one respective value can be determined with the aid of the driving condition sensor system for determining at least one wheel speed and/or a vehicle lateral acceleration and/or a vehicle longitudinal acceleration. According to a further embodiment, at least one respective value can be determined with the aid of the driving condition sensor system for determining a driving moment and/or a braking moment of at least one wheel of the land vehicle. According to a further embodiment, characteristics for the lateral slippage and/or the longitudinal slippage and for the lateral force or longitudinal force acting on at least one wheel can be determined with the aid of an algorithm from the values determined with the driving condition sensor system as the basis for calculation of the at least one slip angle characteristic. According to a further embodiment, an offset correction for at least one acceleration signal of the driving condition sensor system is performed with the aid of a filter algorithm, in particular a Kalman filter. According to a further embodiment, data which is obtained from additional information on the surroundings, can be used for the offset correction of at least one acceleration signal.

According to another embodiment, a device for calculating movement dynamics of a land vehicle set up for acquiring and preparing data of a driving condition sensor system, comprises a yaw rate sensor and a position determining system and having an arithmetic-logic unit which comprises functional units for determining the actual yaw angle and the actual slip angle of a land vehicle according to any of the above mentioned methods.

BRIEF DESCRIPTION OF THE DRAWINGS

Exemplary embodiments of the invention will be described in more detail hereinafter with reference to illustrations in the drawings, in which.

Components with the same function and name are provided with the same reference numerals in the figures.

DETAILED DESCRIPTION

Figure 1:
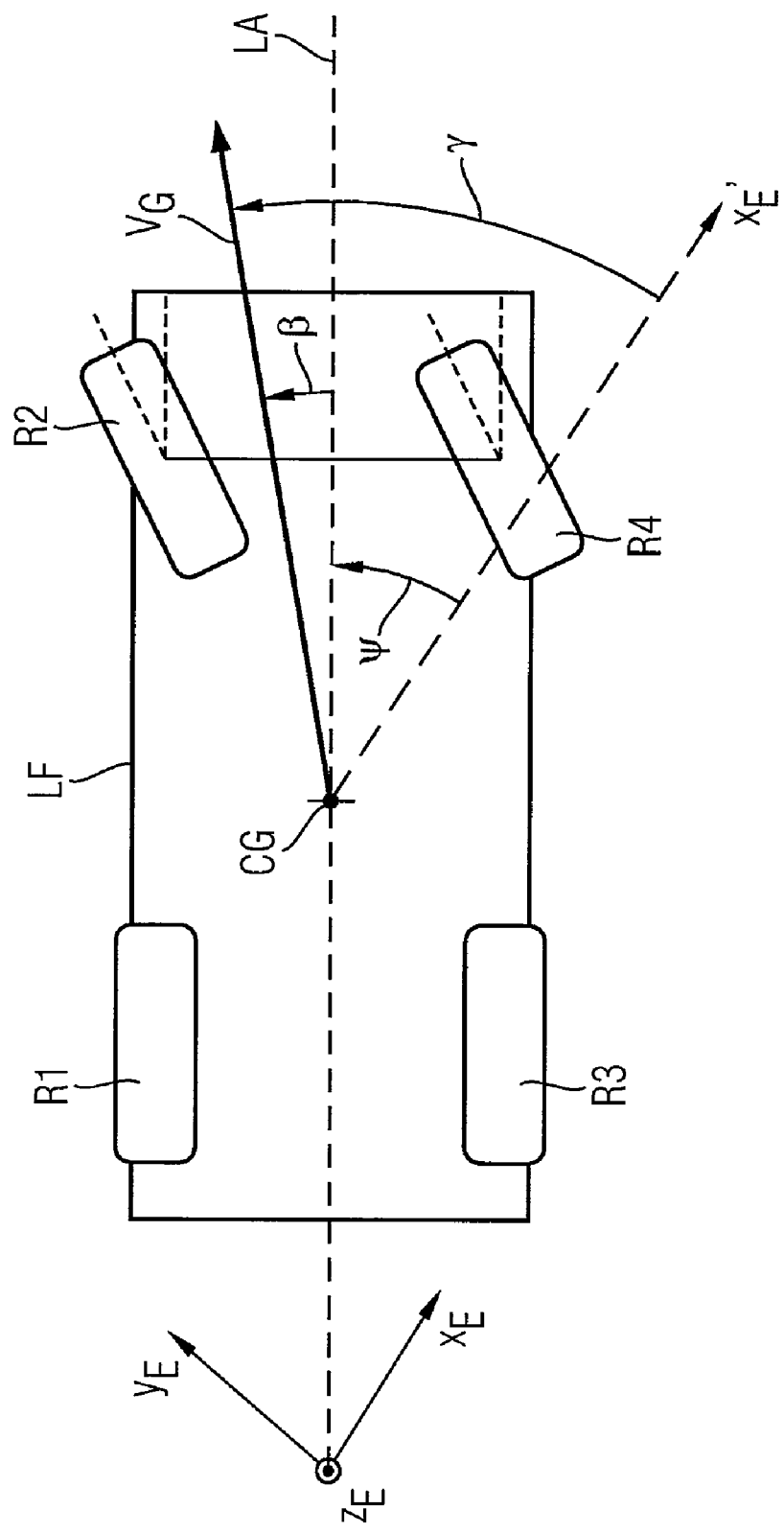
FIG. 1 shows a simplified schematic diagram of a land vehicle with illustration of the relevant angles.

The method according to an embodiment for determining the actual yaw angle and the actual slip angle of a land vehicle uses a driving condition sensor system, a yaw rate sensor and a position determining system which exist in land vehicles. The position determining system can be a satellite transmitter-assisted position determining system and a positioning system that works with terrestrial transmitters or one that combines both possibilities.

By using the data supplied by these systems at least one slip angle characteristic of the land vehicle is firstly determined with the aid of sensor values that are provided by the driving condition sensor system internal to the vehicle and/or the yaw rate sensor.

A current speed vector angle is also determined which is determined as the angle between a speed vector of the land vehicle, determined with values of the position determining sensor, and an earth-fixed axis.

At least one determined slip angle characteristic is compared with at least one fixed characteristic limit value.

If the slip angle characteristic falls below the characteristic limit value, the actual yaw angle is adjusted to match the actual speed vector angle, the actual slip angle being determined with the aid of sensor values which are provided by the driving condition sensor system internal to the vehicle and/or the yaw rate sensor. The slip angle, if it refers to a different point of construction of the land vehicle, is converted to the centre of gravity of the vehicle in this case.

If the slip angle characteristic exceeds the characteristic limit value, the actual yaw angle is determined with the aid of sensor values, which are provided by the yaw rate sensor by continuous value integration on the basis of a preceding adjustment to the speed vector angle, and the slip angle is determined as the difference between the thus determined yaw angle of the land vehicle and the actual speed vector angle.

The device according to an embodiment for calculating movement dynamics of a land vehicle is set up for acquiring and processing data from a driving condition sensor system that exists in a vehicle, a yaw rate sensor and a position determining system and having an arithmetic-logic unit which comprises the functional units for determining the actual yaw angle and the actual slip angle of a land vehicle according to the described method.

The various embodiments allow the slip angle in the vehicle to be reliably determined with sufficient accuracy, even without additional sensor systems, such as a second position determining system or a carriageway identification, if the angle assumes large values over several seconds. At the same time the yaw angle of the vehicle is reliably determined over long time intervals and the offsets that occur in the integrating method are adjusted in brief time intervals. The inertial sensors, in particular the yaw rate sensor, may also be monitored for functional efficiency.

The individual steps are advantageously repeated during the course of determining the actual yaw and slip angles in fixed time intervals (ZI) or time intervals that change for example as a function of the current driving situation. The calculating capacity of the device according to an embodiment can consequently be used as needed and in the case of threatening dangerous situations the accuracy of value determination can be increased by reducing the calculation intervals.

In an advantageous embodiment a static characteristic limit value as well as a dynamic characteristic limit value is established. The static characteristic limit value is a value limit at a specific level. The dynamic characteristic limit value is a value limit which characterizes the increase in the slip angle. This has the advantage that, on the one hand, a decision can be reliably made if the static characteristic limit value is slowly exceeded and on the other hand, by recognizing a rapid change, such as by exceeding the dynamic characteristic limit value, irrespective of the absolute level of the value, exceeding of the static characteristic limit value can be more or less anticipated and a quick reaction possibly be allowed even before the occurrence of the borderline case.

At least one respective value for determining at least one wheel speed and/or vehicle lateral acceleration and/or vehicle longitudinal acceleration can be determined with the aid of the driving condition sensor system. These values can advantageously be used to calculate specific slip angle characteristics. At least one respective value for determining a driving moment and/or a braking moment of at least one wheel of the land vehicle can also be determined with the aid of the driving condition sensor system and likewise or optionally be used to calculate specific slip angle characteristics. This is particularly advantageous if the corresponding sensors exist anyway for example for an antilock braking system, a parking brake system, a navigation system or similar functional units.

Using a specific calculation algorithm, characteristics for the lateral slippage and/or the longitudinal slippage and for the lateral force or longitudinal force acting on at least one wheel can be determined from the values determined with the driving condition sensor system (FZS). These characteristics can advantageously be used as the basis for calculation of the at least one slip angle characteristic.

Additional accuracy when determining the yaw and slip angles may be achieved if an offset correction is carried out for at least one acceleration signal of the driving condition sensor system with the aid of a filter algorithm, in particular a Kalman filter. Offsets which, for example, are caused by unevenness in the carriageway or carriageway gradients can be reduced thereby and the accuracy of the calculations thus increased overall.

To further increase the accuracy of the determined data, additional information on the surroundings can be used for offset correction of at least one acceleration signal. Such information on the surroundings can originate for example from map data from the road maps stored in a navigation system, be transmitted into the system by local information sources (local transmitters), or be provided by existing radar systems, cameras, etc.

In other words various embodiments include an algorithm which recognizes the occurrence of large slip angles (for example >3°). The algorithm uses signals of the driving condition sensor system, which already exists in motor vehicles that are fitted with stability programs, as input data, namely for example wheel speeds, yaw rates and lateral acceleration. The driving moments of the driven wheels and the braking moments of all wheels can also be used. The longitudinal acceleration of the vehicle is optionally also used. The longitudinal slippage of all wheels, the lateral slippage of all wheels and the longitudinal and lateral forces acting on each wheel can be calculated using these values. Characteristics can in turn be calculated from these values, with the aid of which a decision is made on whether the slip angle is already above a defined limit value or is about to go beyond a defined limit value. In this case a flag is set to the value one. Otherwise the flag has the value zero.

Using a Kalman filter offsets of the acceleration sensors, in particular as a result of gradual carriageway gradients, can be corrected or at least improved. Map information of a navigation device as well as potential actual carriageway condition information (for example about road works with steep gradients) may also be used.

If the flag has the value zero, the angle supplied by the navigation receiver between the speed vector of the vehicle and an earth-fixed axis in the carriageway plane is equated with the yaw angle. The integration offset is thus adjusted.

If the flag has the value one, the yaw angle of the vehicle is determined by integration of the yaw rate sensor signal. Since the flag has the value one only over short time intervals (dangerous situation) and the yaw angle integration has been adjusted in advance with the speed vector angle, this manner of yaw angle determination is very precise in this time interval. The slip angle is determined as the difference between the angle supplied by the navigation receiver and the yaw angle in this case.

Thus, in summary, first of all a slip angle characteristic is determined with the aid of a driving condition sensor system, a yaw rate sensor and a position determining system. If the slip angle characteristic remains below the limit value, the actual yaw angle is adjusted to match the actual speed vector angle determined with the aid of the position determining system. If the slip angle characteristic exceeds a specific limit value the actual yaw angle is determined with the aid of sensor values from the yaw rate sensor by continuous value integration and the slip angle is calculated as the difference between yaw angle and speed vector angle.

The simplified schematic diagram in FIG. 1 shows a land vehicle LF in rough outlines, with two non-steerable wheels (rear axle) R1 and R3 and two steerable wheels (front axle) R2 and R4. The longitudinal axis of the vehicle LA and the centre of gravity of the vehicle CG are also shown. The vehicle is shown in a plan view in relation to an earth-fixed coordinate system with main axes $X_E$, $Y_E$ and $Z_E$, the main axes $X_E$ and $Y_E$ covering a plane parallel to the earth's surface and on which the vehicle moves, and the third main axis $Z_E$ is shown from the viewing plane oriented in the opposite direction to the observer. The vehicle plane is aligned parallel to the earth's surface (plane $X_E/Y_E$), the pitch angle θ and the roll angle φ of the vehicle are therefore set at zero. The illustrated actual yaw angle Ψ, based on the vehicle's centre of gravity CG, is therefore the angle between the auxiliary main axis $X_E'$, parallel to the earth-fixed main axis $X_E$ and laid through the vehicle's centre of gravity CG, and the longitudinal axis LA of the vehicle.

The actual speed vector $V_G$ that also issues from the centre of gravity CG of the vehicle LF indicates the value and direction of the actual vehicle speed, based on the vehicle's centre of gravity CG. The actual slip angle β results in this case as the angle between the longitudinal axis LA of the vehicle and the speed vector $V_G$. The actual speed vector angle γ is the angle between the auxiliary main axis $X_E'$ and the speed vector $V_G$.

It is clear from the illustration that as the slip angle β decreases the yaw angle Ψ and the speed vector angle γ match.

Figure 2:
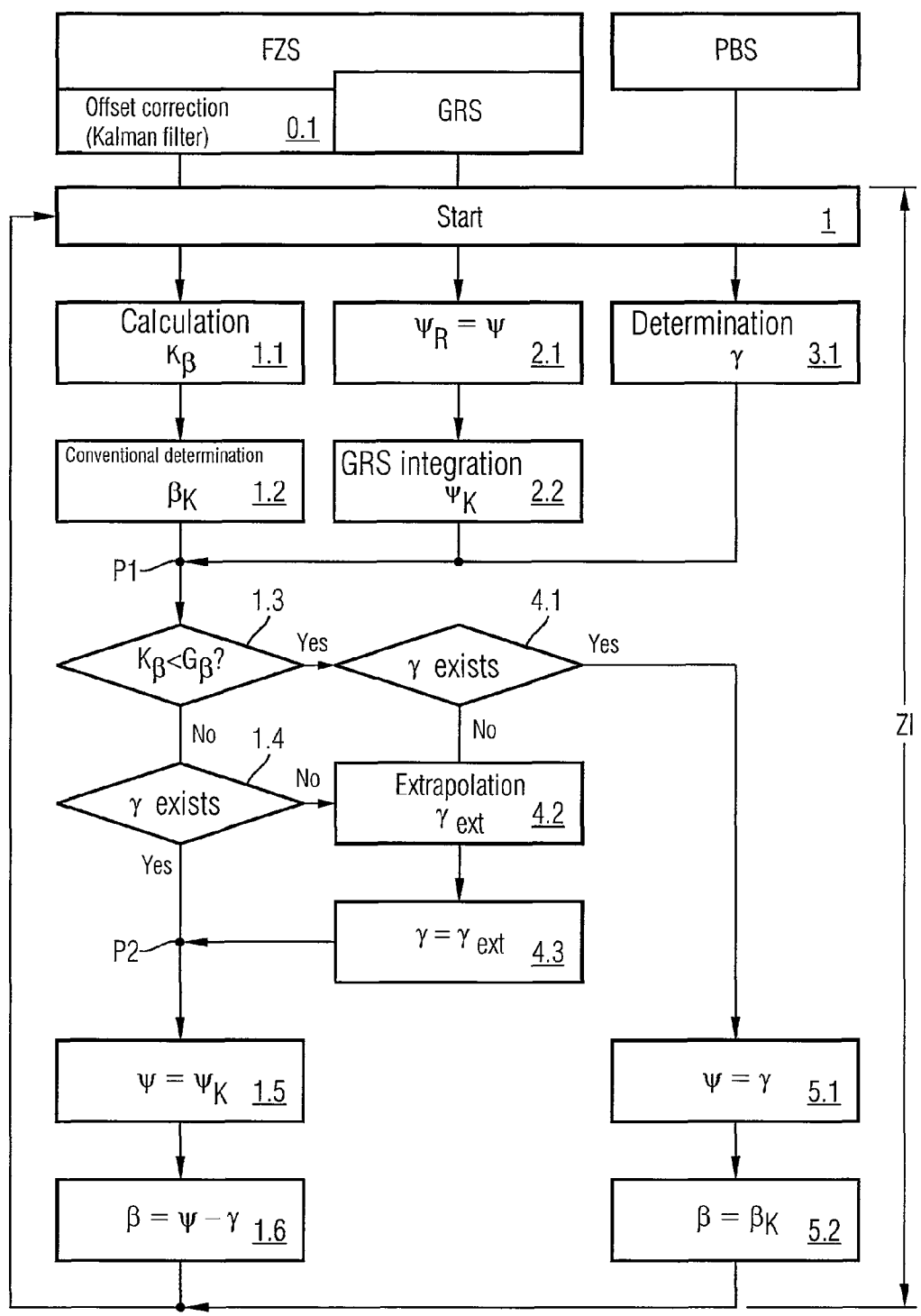
FIG. 2 shows a simplified flow diagram to illustrate the progression of a method according to an embodiment.

FIG. 2 shows the progression of a method according to an embodiment in the form of a flow diagram. The required data and signals are provided by the functional units: driving condition sensor system FZS, yaw rate sensor GRS and position determining system PBS. The yaw rate sensor GRS can be an integral component of the driving condition sensor system FZS, as shown, or an independent sensor unit or a component of the device for calculating movement dynamics of the land vehicle (not shown). In the preceding step 0.1, which in the present case is still carried out inside the driving condition sensor system FZS, there is an offset correction of the required sensor values first of all. This can take place using filter programs, such as a Kalman filter, and with the aid of further information on the surroundings, such as map data from the navigation system, radar measurements or camera images from a distance measuring device or a lane guard system, etc. This offset correction can of course also take place inside the device for calculating vehicle movement dynamics data (see also FIG. 3 in this regard) within the context of signal evaluation and signal processing.

The procedure is started in the first step 1. Steps 1.1, 2.1 and 3.1 then follow simultaneously. Steps 1.2 and 2.2 respectively then follow steps 1.1 and 2.1.

In step 1.1 the slip angle characteristic $K_\beta$ is calculated. This takes place with the aid of an algorithm which uses signals from the driving condition sensor system FZS as input data. A conventional determination/calculation of the actual slip angle is carried out in the following step 1.2 on the basis of these slip angle characteristics $K_\beta$.

In step 2.1 a reference yaw angle $\Psi_R$ is predefined as a starting point for the conventional yaw angle determination that follows in step 2.2. This reference yaw angle $\Psi_R$ is adjusted against the actual yaw angle Ψ last determined in the preceding procedure, i.e. is set at the updated value. Differences in value are thereby cyclically corrected by integration offsets. Conventional determination of the yaw angle $\Psi_K$ takes place in the following step 2.2 by integrating the values supplied by the yaw rate sensor.

In step 3.1 the current speed vector angle γ is determined with the aid of the data supplied by a system for position determination. The position determining system can be a satellite transmitter-assisted position determining system and a position determining system that works with terrestrial transmitters or one that combines both possibilities.

All values required for further progression are therefore available at the following node P1 of the procedure. The slip angle characteristics $K_\beta$ determined in step 1.1 are accordingly compared in the following branch step 1.3 with predefined characteristic limit values $G_\beta$.

If the result of the comparison in step 1.3 is that the slip angle characteristics $K_\beta$ are greater than the characteristic limit values $G_\beta$ then a critical driving condition exists with a relatively large slip angle (for example >3°) that cannot be disregarded. In this case the additional branch step 1.4 follows in the procedure in which it is checked whether a value exists for the speed vector angle γ. It is possible that no actual speed vector angle γ is determined in step 3.1 owing to lack of a signal (for example as a result of satellite signal shadowing).

If no actual speed vector angle γ exists an extrapolation of the speed vector angle $\gamma_{ext}$ is performed in steps 4.2 and 4.3 on the basis of values from preceding cycles, and the actual speed vector angle γ is set to the extrapolated value $\gamma_{ext}$. There thus exists in the node P2 following step 1.4, where an actual speed vector angle γ exists, and step 4.3, after extrapolation of the speed vector angle γ, an updated value of the speed vector angle γ.

The actual yaw angle Ψ is accordingly set in the following step 1.5 to the yaw angle value $\Psi_K$ conventionally determined in step 2.2. The actual slip angle β is subsequently determined from the difference between the actual yaw angle Ψ and the actual speed vector angle γ.

If the result of the comparison in step 1.3 is that the slip angle characteristic $K_\beta$ is below the characteristic limit value $G_\beta$, then the vehicle is in a stable driving condition and the slip angle β can be very safely disregarded.

In this case a check follows in branch step 4.1 as to whether an actual speed vector angle γ is available. If this is not the case the procedure branches to step 4.2 and the actual values for the speed vector angle γ, the yaw angle Ψ and the slip angle β are determined as described above.

However, if it is found in step 4.1 that an actual value exists for the speed vector angle γ, the yaw angle Ψ is subsequently set in step 5.1 to the actual value of the speed vector angle γ. In this case the slip angle β is set in the subsequent step 5.2 to the value $\beta_K$, conventionally determined in step 1.2, which is sufficiently accurate in the case of small values.

Once the method has been run through within the time interval ZI the actual angle values are advantageously determined in each case and the procedure can be started again.

Figure 3:
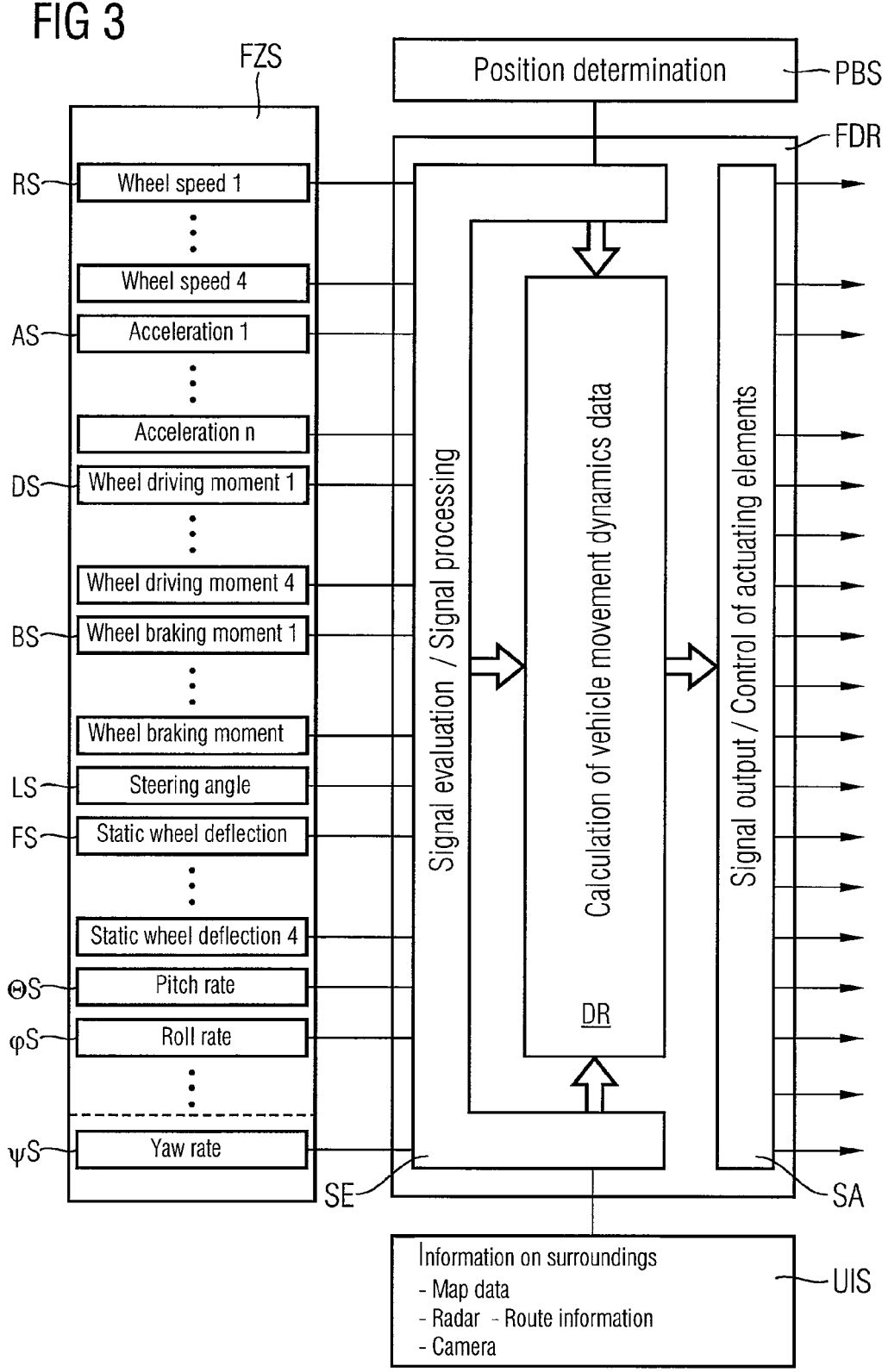
FIG. 3 shows a chart of a device according to an embodiment for calculating vehicle movement dynamics data.

FIG. 3 shows a chart of a device according to an embodiment for calculating movement dynamics data FDR of a vehicle, hereinafter also called vehicle movement dynamics computer FDR. This device is essentially an arithmetic-logic unit which accesses external data and signals to calculate the desired values. For this purpose said vehicle movement dynamics computer FDR is connected to a plurality of sensor units of the driving condition sensor system FZS. The following sensor units are illustrated by way of example in FIG. 3 as components of the driving condition sensor system FZS: wheel speed sensors RS for a plurality of wheels, acceleration sensors AS for different directions, driving moment sensors DS and braking moment sensors BS for the driving moments or braking moments respectively at a plurality of wheels, steering angle sensor LS, displacement sensors FS at a plurality of wheels, pitch, roll and yaw rate sensors θS, φS and ΨS.

Said vehicle movement dynamics computer FDR is also connected to a system for position determining PBS and further information systems UIS for acquiring and optionally processing information on the surroundings. These information systems UIS are shown compiled in a block in FIG. 3 but can by all means be constructed as separate system units. Systems of this kind can be: navigation systems, camera systems, radar systems, radio-assisted route information systems and similar systems for acquiring data on the surroundings.

The vehicle movement dynamics computer FDR substantially comprises functional units for signal evaluation/signal processing SE, for calculating vehicle movement dynamics data DR and for signal output/control SA. The vehicle movement dynamics computer FDR can of course comprise additional functional units, which are not shown in FIG. 3, such as integrated sensor units (gyroscopes) for instance.

The procedure according to an embodiment is carried out by the vehicle movement dynamics computer using a corresponding computer program implemented on the vehicle movement dynamics computer. The calculated values for the angles to be determined can be used directly in the vehicle movement dynamics computer, for example for calculating control variables, or can also be output to external functional modules for further utilization.

What is claimed is:

1. A method for determining the actual yaw angle and the actual slip angle of a land vehicle with the aid of a driving condition sensor system, a yaw rate sensor and a position determining system, the method comprising the steps of:
    determining at least one slip angle characteristic of the land vehicle with the aid of sensor values which are provided by the driving condition sensor system internal to the vehicle and/or the yaw rate sensor;
    determining an actual speed vector angle which is determined as the angle between a speed vector of the land vehicle, determined with values of the position determining system, and an earth-fixed axis;
    comparing the at least one slip angle characteristic with at least one static slip characteristic limit value;
    comparing a rate of change of the at least one slip angle characteristic with at least one dynamic slip characteristic limit value;
    if neither the at least one static slip characteristic limit value nor the at least one dynamic slip characteristic limit value are exceeded:
        adjusting the actual yaw angle to match the actual speed vector angle, and
        determining the actual slip angle with the aid of the sensor values which are provided by the driving condition sensor system internal to the vehicle and/or the yaw rate sensor;
    if either the at least one static slip characteristic limit value or the least one dynamic slip characteristic limit value is exceeded:
        determining the actual yaw angle with the aid of sensor values which are provided by the yaw rate sensor by continuous value integration on the basis of a preceding adjustment to the speed vector angle, and
        determining the slip angle as the difference between the thus determined yaw angle of the land vehicle and the actual speed vector angle.

2. The method according to claim 1, wherein the method steps are repeated in fixed or changeable time intervals.

3. The method according to claim 1, wherein the at least one dynamic slip characteristic limit value is defined irrespective of the at least one static slip characteristic limit value.

4. The method according to claim 1, wherein at least one respective value is determined with the aid of the driving condition sensor system for determining at least one wheel speed and/or a vehicle lateral acceleration and/or a vehicle longitudinal acceleration.

5. The method according to claim 1, wherein at least one respective value is determined with the aid of the driving condition sensor system for determining a driving moment and/or a braking moment of at least one wheel of the land vehicle.

6. The method according to claim 1, wherein characteristics for the lateral slippage and/or the longitudinal slippage and for the lateral force or longitudinal force acting on at least one wheel are determined with the aid of an algorithm from the values determined with the driving condition sensor system as the basis for calculation of the at least one slip angle characteristic.

7. The method according to claim 1, wherein an offset correction for at least one acceleration signal of the driving condition sensor system is performed with the aid of a filter algorithm, in particular a Kalman filter.

8. The method according to claim 1, wherein data which is obtained from additional information on the surroundings, is used for the offset correction of at least one acceleration signal.

9. The method according to claim 1, wherein an offset correction for at least one acceleration signal of the driving condition sensor system is performed with a Kalman filter.

* * * * *